United States Patent
Wang et al.

(10) Patent No.: US 10,762,826 B2
(45) Date of Patent: Sep. 1, 2020

(54) PIXEL CIRCUIT, DISPLAY PANEL, DISPLAY DEVICE AND DRIVING METHOD (71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xiurong Wang, Beijing (CN); Lingyun Shi, Beijing (CN); Wei Sun, Beijing (CN); Xue Dong, Beijing (CN); Dong Chen, Beijing (CN); Shengji Yang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/329,790

(22) PCT Filed: Mar. 26, 2018

(86) PCT No.: PCT/CN2018/080466
§ 371 (c)(1),
(2) Date: Mar. 1, 2019

(87) PCT Pub. No.: WO2019/011004
PCT Pub. Date: Jan. 17, 2019

(65) Prior Publication Data
US 2019/0197939 A1 Jun. 27, 2019

(30) Foreign Application Priority Data
Jul. 13, 2017 (CN) .......................... 2017 1 0574330

(51) Int. Cl.
G09G 3/20 (2006.01)
G09G 3/36 (2006.01)
(Continued)

(52) U.S. Cl.
CPC ..... G09G 3/2074 (2013.01); G02F 1/136277 (2013.01); G09G 3/32 (2013.01);
(Continued)

(58) Field of Classification Search
CPC ...... G09G 3/2074; G09G 3/36; G09G 3/3685; G09G 3/3688; G09G 3/3275;
(Continued)

(56) References Cited

U.S. PATENT DOCUMENTS

2002/0118153 A1* 8/2002 Kimura ................ G09G 3/2074
345/87
2009/0315901 A1 12/2009 Qiao et al.
(Continued)

FOREIGN PATENT DOCUMENTS

CN 101290746 A 10/2008
CN 102243856 A 11/2011
(Continued)

OTHER PUBLICATIONS

International Search Report and Written Opinion in corresponding International Patent Application No. PCT/CN2018/080466 dated Jul. 16, 2018. 16 pages.
(Continued)

Primary Examiner — Rodney Amadiz
(74) Attorney, Agent, or Firm — Leason Ellis LLP (57) ABSTRACT A pixel circuit, a display panel, a display device and a driving method thereof are provided. The display panel includes a silicon substrate and a plurality of display units and a plurality of storage units fabricated on the silicon substrate. The plurality of storage units correspond to the
(Continued)

plurality of display units one to one, and the plurality of storage units are respectively configured to receive and store display data of the plurality of display units corresponding to the plurality of storage units.

16 Claims, 6 Drawing Sheets

(51) Int. Cl.
*G09G 3/3275* (2016.01)
*G09G 3/32* (2016.01)
*G02F 1/1362* (2006.01)

(52) U.S. Cl.
CPC ............ *G09G 3/3275* (2013.01); *G09G 3/36* (2013.01); *G09G 3/3607* (2013.01); *G09G 3/3685* (2013.01); *G09G 3/3688* (2013.01); G09G 3/3696 (2013.01); G09G 2300/0408 (2013.01); G09G 2300/0804 (2013.01); G09G 2300/0857 (2013.01); G09G 2310/027 (2013.01); G09G 2310/0291 (2013.01); G09G 2310/04 (2013.01); G09G 2320/103 (2013.01); G09G 2330/021 (2013.01); G09G 2330/028 (2013.01); G09G 2360/128 (2013.01)

(58) Field of Classification Search
CPC ................... G09G 3/3607; G09G 3/32; G09G 2300/0408; G09G 2300/0857; G09G 3/3696; G09G 2330/028; G09G 2310/027; G09G 2300/0804; G09G 2320/103; G09G 2310/04; G09G 2360/128; G09G 2330/021; G09G 2310/0291; G02F 1/136277

See application file for complete search history.

(56) References Cited

U.S. PATENT DOCUMENTS

| | | | |
|---|---|---|---|
| 2011/0141069 A1 | 6/2011 | Hirakata et al. | |
| 2011/0260158 A1 | 10/2011 | Takemura | |
| 2013/0169663 A1* | 7/2013 | Seong | G09G 5/00 345/589 |
| 2019/0197939 A1 | 7/2019 | Wang et al. | |

FOREIGN PATENT DOCUMENTS

| | | |
|---|---|---|
| CN | 102763154 A | 10/2012 |
| CN | 103325329 A | 9/2013 |
| CN | 106448553 A | 2/2017 |
| CN | 106873205 A | 6/2017 |
| CN | 107167976 A | 9/2017 |

OTHER PUBLICATIONS

Chinese Office Action in corresponding Chinese Application No. 201710574330.5 dated Mar. 7, 2019 (an English translation attached hereto). 20 pages.

* cited by examiner

PIXEL CIRCUIT, DISPLAY PANEL, DISPLAY DEVICE AND DRIVING METHOD

CROSS REFERENCE TO RELATED APPLICATION

This application is a U.S. National Stage Application under 35 U.S.C. § 371 of International Patent Application No. PCT/CN2018/080466, filed Mar. 26, 2018, which claims the benefit of priority to Chinese patent application No. 201710574330.5 filed on Jul. 13, 2017, both of which are incorporated by reference in their entireties as part of the present application.

TECHNICAL FIELD

Embodiments of the present disclosure relate to a pixel circuit, a display panel, a display device and a driving method.

BACKGROUND

A display device, such as a TFT-LCD (Thin Film Transistor Liquid Crystal Display), scans gate lines row by row to gate each row of the gate lines row by row, then outputs data voltages to each subpixel through data lines, and finally displays one frame image. In a prior art, when a plurality of frames of images are continuously displayed, a full-screen image is usually updated at a specific frequency, for example, 60 Hz. However, in this way, in the case that a part or all of the displayed image does not change in consecutive multi-frames, multiple full-screen updates increase a power consumption of the display device.

SUMMARY

At least one embodiment of the present disclosure provides a display panel, comprising a silicon substrate and a plurality of display units and a plurality of storage units fabricated on the silicon substrate; the plurality of storage units correspond to the plurality of display units one to one, and the plurality of storage units are respectively configured to receive and store display data of the plurality of display units corresponding to the plurality of storage units.

For example, in a display panel provided by an embodiment of the present disclosure, the display panel comprises a plurality of subpixels, and the display units are respectively disposed in the subpixels; and the storage units are respectively in the subpixels, or are each between the two adjacent subpixels.

For example, in a display panel provided by an embodiment of the present disclosure, a material employed by the silicon substrate comprises monocrystalline silicon, polycrystalline silicon, or amorphous silicon.

For example, in a display panel provided by an embodiment of the present disclosure, the storage units each comprise a static random access memory.

For example, in a display panel provided by an embodiment of the present disclosure, the display units each comprise a reflective layer covering the silicon substrate and a liquid crystal layer in sequence.

For example, in a display panel provided by an embodiment of the present disclosure, the display units each comprise an organic light emitting display device or an LED display device, the organic light emitting diode or the LED display device being disposed on the silicon substrate.

For example, in a display panel provided by an embodiment of the present disclosure, the display panel further comprises a data driving circuit disposed on the silicon substrate, and the data driving circuit is connected with the display units and the storage units; and the data driving circuit is configured to load the display data stored in the storage units into the display units.

For example, in a display panel provided by an embodiment of the present disclosure, the data driving circuit comprises a gamma voltage circuit, a plurality of switch circuits, and a plurality of decoding circuits; each decoding circuit of the decoding circuits is electrically connected with one storage unit, one switch circuit and one data line, and the each decoding circuit is configured to turn on one switch device of the switch circuits according to the display data stored in the storage units; each of the switch circuits is electrically connected with a plurality of gray-scale output terminals of the gamma voltage circuit through a plurality of switch devices in each of the switch circuits one by one; and the gamma voltage circuit is configured to generate a plurality of gray-scale voltages, and output the gray-scale voltages to a data line electrically connected with a turned-on switch device through the turned-on switch device of each of the switch circuits.

For example, in a display panel provided by an embodiment of the present disclosure, the gamma voltage circuit comprises a gamma voltage regulation sub-circuit, a plurality of digital-to-analog conversion sub-circuits, and a plurality of operational amplification sub-circuits; a plurality of output terminals of the gamma voltage regulation sub-circuit are connected with the plurality of digital-to-analog conversion sub-circuits one to one; each of the digital-to-analog conversion sub-circuits is electrically connected with an input terminal of one of the operational amplification sub-circuits; and output terminals of the operational amplification sub-circuits are the gray-scale output terminals of the gamma voltage circuit.

At least one embodiment of the present disclosure provides a pixel circuit, comprising a storage unit disposed on a silicon substrate, the storage unit is configured to receive and store display data matched with the subpixel where the pixel circuit is located.

At least one embodiment of the present disclosure provides a display device, comprising the display panel according to any embodiment and an image processor connected with the display panel, the image processor is configured to output the display data to the storage units, and the display data are matched with subpixels where the display units corresponding to the storage units are located.

At least one embodiment of the present disclosure provides a driving method of the display device according to any embodiment, when the display panel comprises a data driving circuit and subpixels, the driving method comprises: before one frame image is displayed, the image processor determining whether each of the subpixels is a dynamic pixel or a static pixel; the image processor outputting display data matched with the dynamic pixel to a storage unit corresponding to a display unit in the dynamic pixel, the storage unit storing the display data; the data driving circuit loading the display data stored in the storage units into the display units; and turning-on each of the subpixels to display an image.

For example, in a driving method provided by an embodiment of the present disclosure, when the data driving circuit comprises a gamma voltage circuit, a plurality of switch circuits and a plurality of decoding circuits, the data driving circuit loading the display data stored in the storage units into the display units comprises: the decoding circuits turning on one switch device of each of the switch circuits according to the display data stored in the storage units; the gamma voltage circuit generating a plurality of gray-scale voltages, and outputting the gray-scale voltages to a data line electrically connected with a turned-on switch device through the turned-on switch device of each of the switch circuits.

For example, in a driving method provided by an embodiment of the present disclosure, after the image processor determines whether each of the subpixels is a dynamic pixel or a static pixel, and before the image processor outputs the display data matched with the dynamic pixel to the storage unit corresponding to the display unit in the dynamic pixel, the driving method further comprises: the image processor acquiring an address of the dynamic pixel and performing addressing on the dynamic pixel according to the address.

For example, in a driving method provided by an embodiment of the present disclosure, the image processor determining whether each of the subpixels is a dynamic pixel or a static pixel comprises: the image processor obtaining display data of consecutive frames of images; and the image processor determining that, when a number of repetitions of the consecutive n frames of display data matched with one subpixel is greater than or equal to m, the one subpixel is a static pixel; and the image processor determining that, when the number of repetitions of the consecutive n frames of display data matched with one subpixel is less than m, the one subpixel is a dynamic pixel; $1<m \leq n$, n and m are positive integers.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment, without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1A:
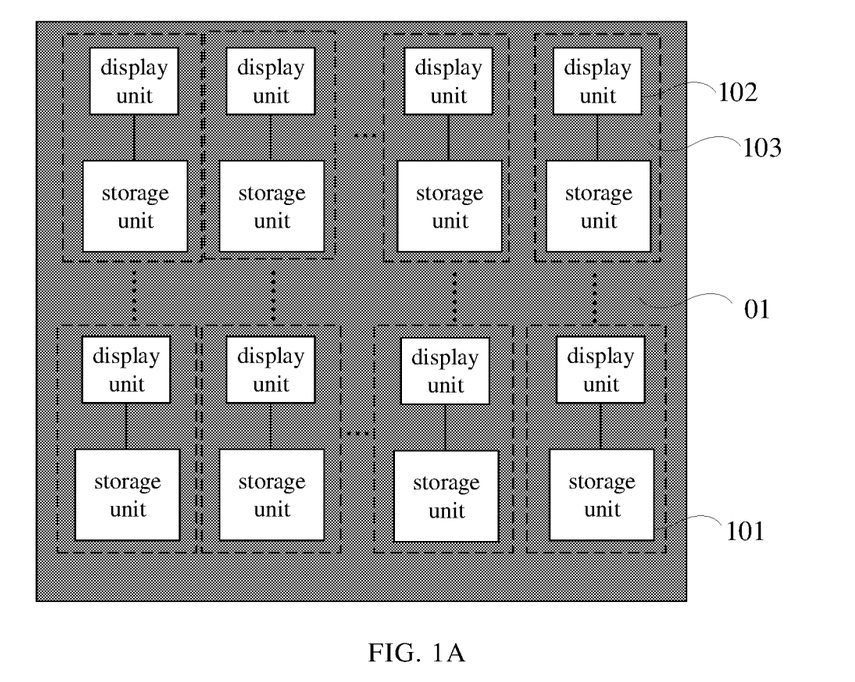
FIG. 1A is a structural schematic diagram of a display panel according to some embodiments of the present disclosure.

Embodiments of the present disclosure provide a display panel, as shown in FIG. 1A, including a silicon substrate 01 and a plurality of display units 102 and a plurality of storage units 101 (Register) fabricated on the silicon substrate 01. For example, the storage unit 101 can be fabricated on the silicon substrate 01 by means of a Complementary Metal Oxide Semiconductor (CMOS) process. For example, the plurality of storage units 101 correspond to the plurality of display units 102 one to one. The plurality of storage units 101 are respectively configured to receive and store display data (for example, RGB data) of the plurality of display units 102 corresponding to the plurality of storage units 101.

Figure 1B:
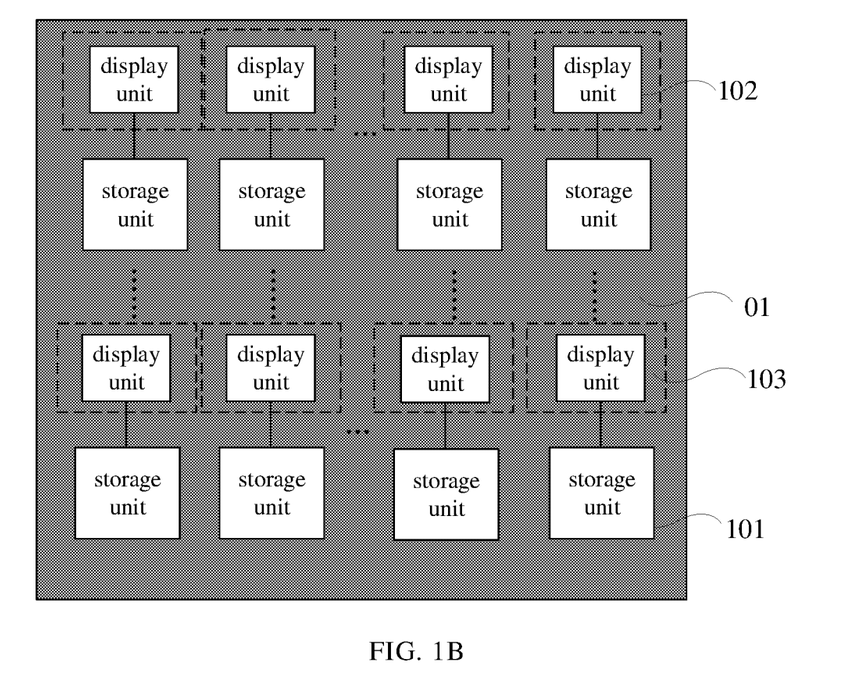
FIG. 1B is a structural schematic diagram of another display panel according to some embodiments of the present disclosure.

For example, as shown in FIG. 1A and FIG. 1B, the display panel according to the embodiments of the present disclosure can further include a plurality of subpixels 103, and the display units 102 are respectively disposed in the subpixels.

For example, as shown in FIG. 1A and FIG. 1B, the display panel includes a display region for arranging subpixels 103 and a non-display region located at a periphery of the display region. For example, in the embodiment as shown in FIG. 1A, the storage units 101 are respectively in the subpixels 103. Or, in the embodiment as shown in FIG. 1B, the storage units 101 are each between two adjacent subpixels 103.

It should be noted that in the embodiments of the present disclosure, the positions of the storage units 101 are not limited, for example, the storage units 101 can also be in the non-display region of the display panel. Because each of the display units 102 corresponds to one storage unit 101, for a high PPI (Pixels Per Inch) display panel, there is a relatively large number of storage units 101, and compared with the arrangement of the storage units 101 at the non-display region of the display panel, the arrangement of the storage units 101 at the display region of the display panel can reduce a wiring difficulty of the non-display region of the display panel.

In addition, in the embodiments of the present disclosure, the one-to-one correspondence between the storage units 101 and the display units 102 means that the display data stored in the storage units 101 match the subpixels 103 where the display units 102 are located in one frame image.

For example, in the embodiments of the present disclosure, the silicon substrate 01 is made of a semiconductor material such as monocrystalline silicon, polycrystalline silicon, amorphous silicon, or the like. For example, the silicon substrate 01 can be made of the monocrystalline silicon with a relatively high purity.

For example, the display data matched with each of the display units 102 can be an 8-bit binary number which can have $2^8=256$ combinations, for corresponding to 256 gray-scale values (0, 1 . . . 255).

For example, the devices disposed on the silicon substrate 01 can be located on different layers. For example, when a thin film transistor (TFT) is disposed in each subpixel 103 and on the above-mentioned silicon substrate 01, the storage units 101 can be disposed at a lower layer of the silicon substrate 01 with respect to this TFT.

For example, in the embodiments of the present disclosure, the storage units 101 each can be a Static Random Access Memory (SRAM). In a case that a refresh circuit is not necessary, the SRAM can store its internal data, thereby avoiding a problem of an increased power consumption caused by the arrangement of the refresh circuit.

In the embodiments of the present disclosure, each of the display units 102 corresponds to one storage unit 101, and the storage unit 101 stores display data matched with the subpixel 103 where the display unit 102 is located. In this case, for example, it is possible to judge whether each of the subpixels 103 is a static pixel or a dynamic pixel before one frame image is displayed. For example, when frames of images are displayed consecutively, subpixels 103 corresponding to the portion where the image changes are the dynamic pixels, and subpixels 103 corresponding to the portion where the image does not change are the static pixels. In this case, the storage units 101 corresponding to the dynamic pixels can receive display data matched with the dynamic pixels, so as to update the display data. The storage units 101 corresponding to the static pixels only need to keep the display data which are stored before. In this way, when frames of images are displayed consecutively, and a part of the image does not change in consecutive frames, the storage units 101 corresponding to the dynamic pixels receive display data, and the storage units 101 corresponding to the static pixels do not need to receive new display data. Therefore, the display panels provided by the embodiments of the present disclosure do not need to update a full screen image during a display process, and the power consumption can be reduced. Based on this, when all the subpixels 103 in one frame image are static pixels, it is not necessary to update the entire display image.

Figure 2:
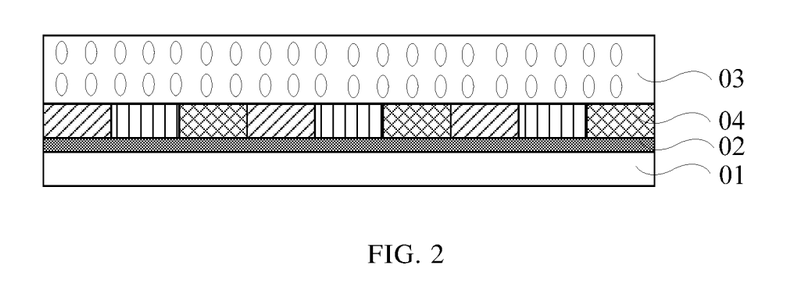
FIG. 2 is a longitudinal section view of a display unit in FIG. 1A or FIG. 1B.

For example, the display panels provided by the embodiments of the present disclosure can be Si-based liquid crystal display panels. In this case, as shown in FIG. 2, the display units 102 each can further include a reflective layer 02 covering the silicon substrate 01 and a liquid crystal layer 03 in sequence. For example, the reflective layer 02 can reflect light incident onto the display panel from an external light source (for example, natural light), and the reflected light can display different gray-scales after passing through the liquid crystal layers 03 with different deflection angles. This display panel implements display using the external light source, and does not need a backlight, thereby further reducing the power consumption.

For example, as shown in FIG. 2, the display units 102 each can further include a color filter layer 04 which is disposed on one side of the liquid crystal layer 03 facing the reflective layer 02. Alternatively, the color filter layer 04 can also be disposed on one side away from the reflective layer 02. The color filter layer 04 can realize color display.

For another example, the display panels provided by the embodiments of the present disclosure can be Si-based LED display panels. In this case, the display units 102 each can further include an Organic Light Emitting Diode (OLED) or an LED display device, and the Organic Light Emitting Diode or the LED display device is disposed on the silicon substrate 01.

Figure 3:
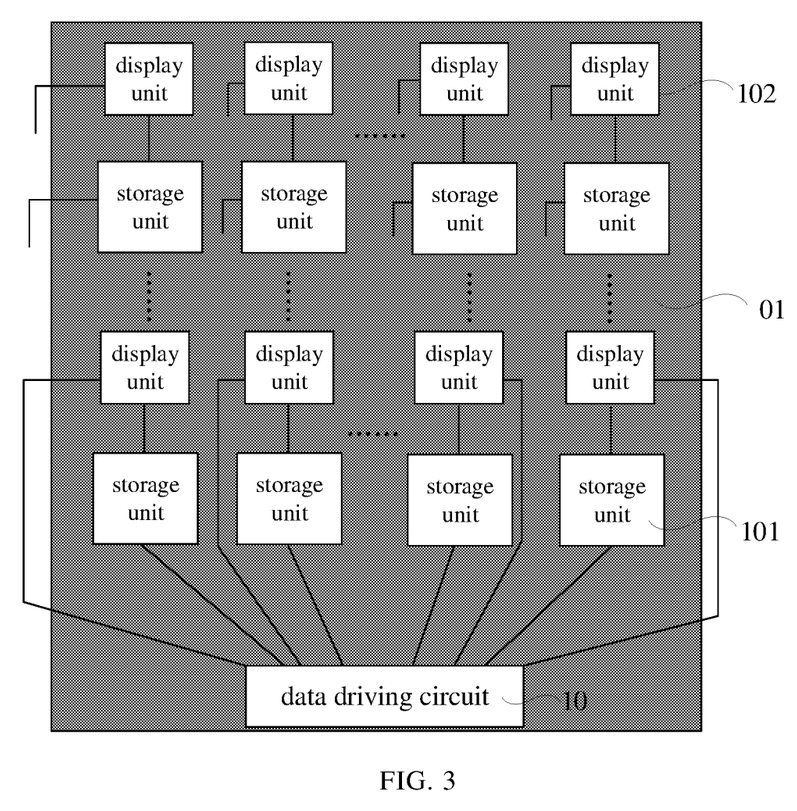
FIG. 3 is a structural schematic diagram of yet another display panel according to some embodiments of the present disclosure.

For example, as shown in FIG. 3, the display panel can further include a data driving circuit 10 disposed on the silicon substrate 01. The data driving circuit 10 is connected with the display units 102 and the storage units 101. For example, the data driving circuit 10 can be fabricated on the silicon substrate 01 by means of a COMS process, and is configured to load display data stored in each storage unit 101 into the display unit 102.

The specific structure of the data driving circuit 10 will be described below in detail.

Figure 4:
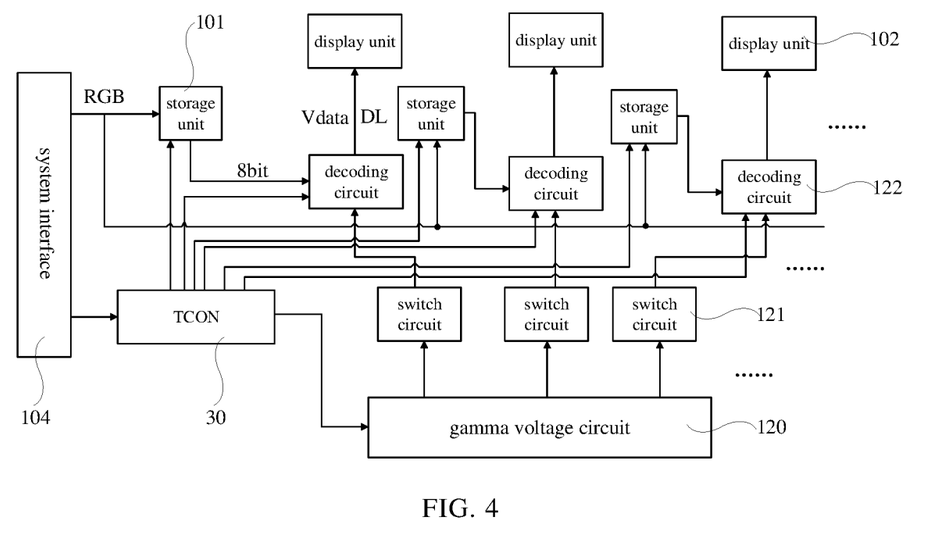
FIG. 4 is a structural schematic diagram of a data driving circuit in FIG. 3.

For example, as shown in FIG. 4, in an embodiment of the present disclosure, the data driving circuit 10 can include a gamma voltage circuit 120, a plurality of switch circuits 121 (MUX), and a plurality of decoding circuits 122.

For example, each decoding circuit 122 is electrically connected with one storage unit 101, one switch circuit 121 and one data line (DL). Based on this, each display unit 102 corresponds to one data line DL, one decoding circuit 122, one storage unit 101 and one switch circuit 121.

Figure 5:
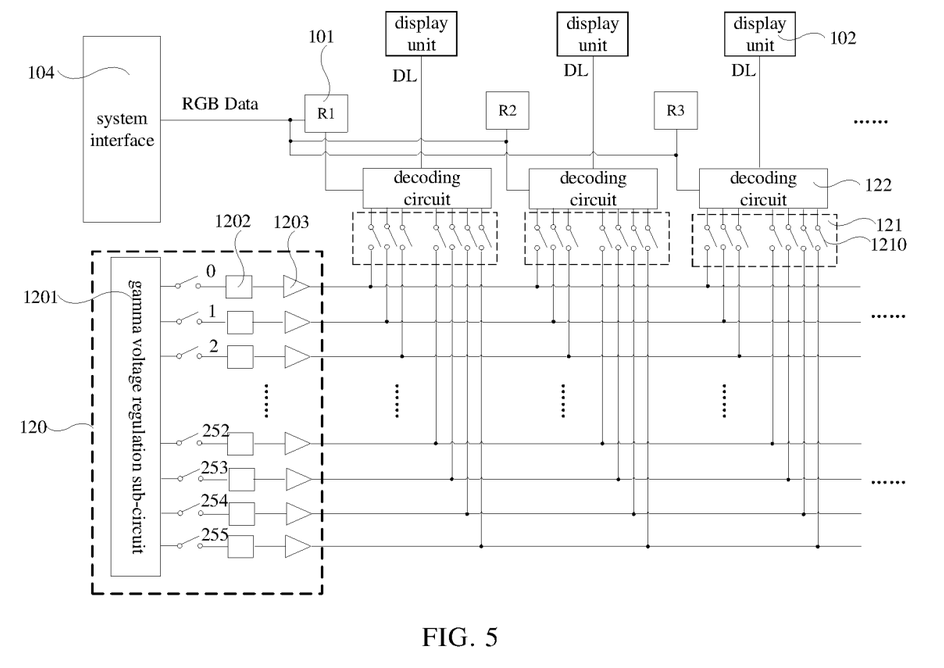
FIG. 5 is another structural schematic diagram of a data driving circuit in FIG. 3.

For example, the each decoding circuit 122 is configured to turn on one switch device 1210 (as shown in FIG. 5) of the switch circuits 121 according to display data stored in the storage units 101.

It should be noted that, when the display data stored in each storage unit 101 is an 8-bit binary number, the switch circuits 121 each can include 256 switch devices 1210. In this case, each combined 8-bit binary number can correspond to turning on a switch device 1210.

For example, each of the switch circuits 121 is electrically connected with a plurality of gray-scale output terminals of the gamma voltage circuit 120 through a plurality of switch devices 1210 in each of the switch circuits 121 one by one. The gamma voltage circuit 120 is configured to generate a plurality of (for example, 256) gray-scale voltages, and output the gray-scale voltages to a data line DL electrically connected with a turned-on switch device 1210 through the turned-on switch device 1210 of each of the switch circuits 121.

It should be noted that the data line DL electrically connected with the turned-on switch device 1210 refers to the fact that: when a switch device 1210 is turned on, one terminal of the switch device 1210 is electrically connected with the gray-scale output terminal of the gamma voltage circuit 120, the other terminal of the switch device 1210 is electrically connected with the decoding circuit 122, and the decoding circuit 122 is electrically connected with a data line DL. Therefore, an analog voltage output by the gamma voltage circuit 120 through the gray-scale output terminal can be transmitted to the data line DL electrically connected with a switch device 1210 through the turned-on switch device 1210.

For example, as shown in FIG. 5, in an embodiment of the present disclosure, the gamma voltage circuit 120 can include a gamma voltage regulation sub-circuit 1201, a plurality of digital-to-analog conversion sub-circuits 1202 (DAC), and a plurality of operational amplification sub-circuits 1203.

For example, a plurality of output terminals of the gamma voltage regulation sub-circuit 1201 are electrically connected with digital-to-analog conversion sub-circuits 1202 one to one.

For example, the gamma voltage regulation sub-circuit 1201 can generate digital signals one-to-one corresponding to 256 gray-scale values through its internal storage unit, and output to each of the digital-to-analog conversion sub-circuits 1202 through 256 output terminals respectively. The digital signal is converted to an analog signal by the digital-to-analog conversion sub-circuit 1202.

For example, each digital-to-analog conversion sub-circuit 1202 is further electrically connected with an input terminal of an operational amplification sub-circuit 1203, thereby amplifying the analog signal by the operational amplification sub-circuit 1203.

For example, output terminals of the operational amplification sub-circuits 1203 are the gray-scale output terminals of the gamma voltage circuit 120, for electrically connecting the switch devices 1210 of the switch circuit 121.

In the embodiments of the present disclosure, before displaying one frame image, the subpixels 103 can be judged to confirm which subpixels 103 are dynamic pixels and which subpixels 103 are static pixels. In this case, the storage units 101 corresponding to the display units 102 in the dynamic pixels receive display data matched with the dynamic pixels, so as to update the display data stored in the storage units 101. The storage units 101 corresponding to the display units 102 in the static pixels keep the original display data unchanged. Next, as shown in FIG. 4 and FIG. 5, each storage unit 101 connected with the decoding circuit 122 is connected with the gamma voltage circuit 120 through a switch circuit 121. Based on this, the 8-bit binary numbers stored in the storage units 101 can correspond to 256 (0-255) different gray-scale voltage values generated by the gamma voltage regulation sub-circuit 1201 in the gamma voltage circuit 120 by the decoding circuit 122. Then, the gray-scale voltage values are converted into the data voltages (Vdata) on the data lines DL by the digital-to-analog conversion sub-circuits 1202 in the gamma voltage circuit 120, and the data voltages are input into the display units 102 connected with the data lines DL, so as to charge the display units 102, thereby displaying the image.

For example, as shown in FIG. 4, in an embodiment of the present disclosure, the data driving circuit 10 can further include a timing control circuit 30 (TCON). For example, the timing control circuit 30 is electrically connected with the storage units 101, the gamma voltage circuit 120 and the decoding circuits 122. The timing control circuit 30 receives a vertical synchronization signal (VSYNC), a horizontal synchronization signal (HSYNC) or a reset signal (RST) through a system interface 104. For example, the timing control circuit 30 can output a timing control signal to the storage units 101, the gamma voltage circuit 120 and the decoding circuits 122 under control of the above-mentioned signals, so that the storage units 101, the gamma voltage circuit 120, and the decoding circuits 122 receive or transmit data according to the timing control signal.

Figure 6:
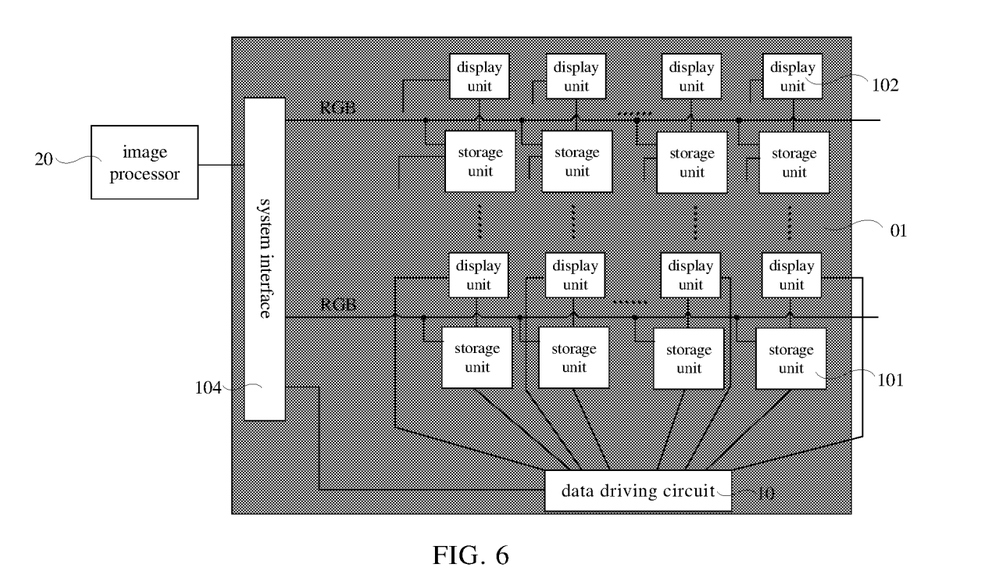
FIG. 6 is a structural schematic diagram of a display device according to some embodiments of the present disclosure.

The embodiments of the present disclosure further provide a display device, as shown in FIG. 6, which includes any display panel provided by the embodiments of the present disclosure and an image processor 20 (Graphics Processing Unit, GPU) connected with the display panel. For example, the image processor 20 is configured to output display data to the storage units 101, and the display data are matched with subpixels 103 where the display units 102 corresponding to the storage units 101 are located.

For example, the image processor 20 can be an application processor (AP). The image processor 20 is connected with the data driving circuit 10 through the system interface 104 of the data driving circuit 10. The image processor 20 stores consecutive frames of images.

The image processor 20 transmits display data matching the dynamic pixels in a frame image, in a form of data package, to the storage units 101 corresponding to the display units 102 in dynamic pixels, so as to update the display data stored in the storage units 101.

For example, when the image processor 20 transmits display data to the storage units 101 corresponding to the display units 102 in the dynamic pixels, a priority can be set such that the storage units 101 receive the corresponding display data according to the above-mentioned priority in sequence. Although each storage unit 101 receives the display data in an order, the above-mentioned display data is transmitted rapidly. Based on this, because each display unit 102 is connected with a data line DL, when the display driving circuit 10 loads the display data stored in each storage unit 101 into the display unit 102, the display device provided by the embodiment of the present disclosure can control all gate lines to be turned on simultaneously to display images, thereby eliminating the need for progressive scanning of the gate lines, and reducing a response time of switching screen by the display device.

It should be noted that in the embodiments of the present disclosure, the display device can be a display, a liquid crystal panel, a liquid crystal television, an OLED panel, an OLED television, an electronic paper, a notebook computer, a navigator, a digital photo frame, a mobile phone, a tablet computer and other products or members having display function. This display device has the same beneficial effects as the display panel according to the above-mentioned embodiments, and details are not described here again.

The embodiments of the present disclosure further provide a pixel circuit, including a storage unit 101 disposed on a silicon substrate 01. The storage unit 101 is configured to receive and store display data matched with the subpixel 103 where the pixel circuit is located.

Based on this, the display panel further includes the above-mentioned data driving circuit 10. As mentioned above, when the display panel is connected with the image processor 20, the image processor 20 can output display data to each storage unit 101. The data driving circuit 10 loads the display data stored in each storage unit 101 to the above-mentioned display unit 102.

It should be noted that the above-mentioned display panel has the same beneficial effects as the display panel according to the above-mentioned embodiments of the present disclosure, and details are not described here again.

Figure 7:
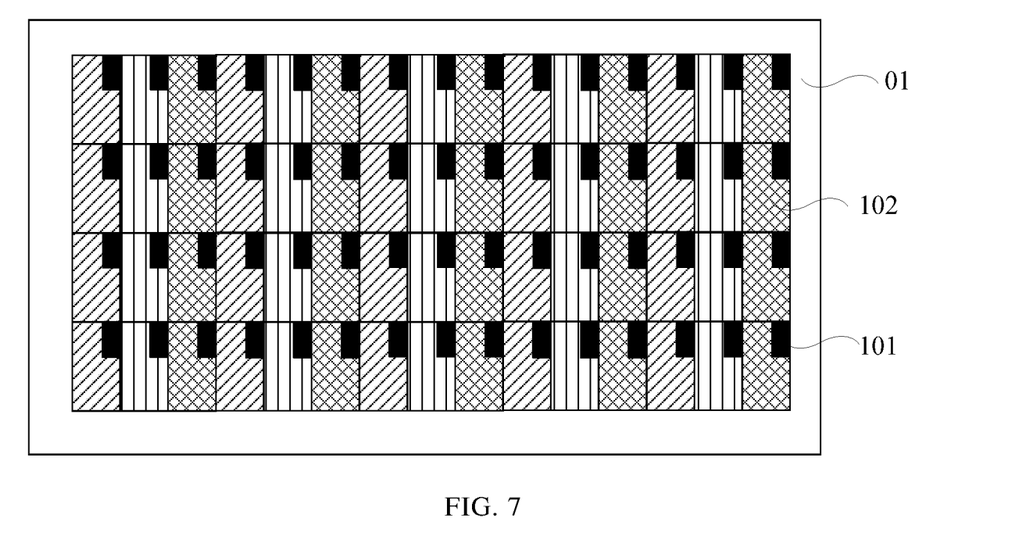
FIG. 7 is a structural schematic diagram of yet another display panel according to some embodiments of the present disclosure.

For example, FIG. 7 shows a display panel according to the embodiments of the present disclosure, including a silicon substrate 01 and a plurality of display units 102 and a plurality of storage units 101 fabricated on the silicon substrate 01. The storage units 101 correspond to the display units 102 one to one. The storage units 101 are respectively configured to receive and store display data of the plurality of display units 102 corresponding to the plurality of storage units 101. For example, as shown in FIG. 7, each of the display units 102 and the corresponding storage unit 101 can form a subpixel. For example, in each line, three subpixels of R, G and B can be disposed in sequence, corresponding to three colors, so as to implement color display.

Figure 8:
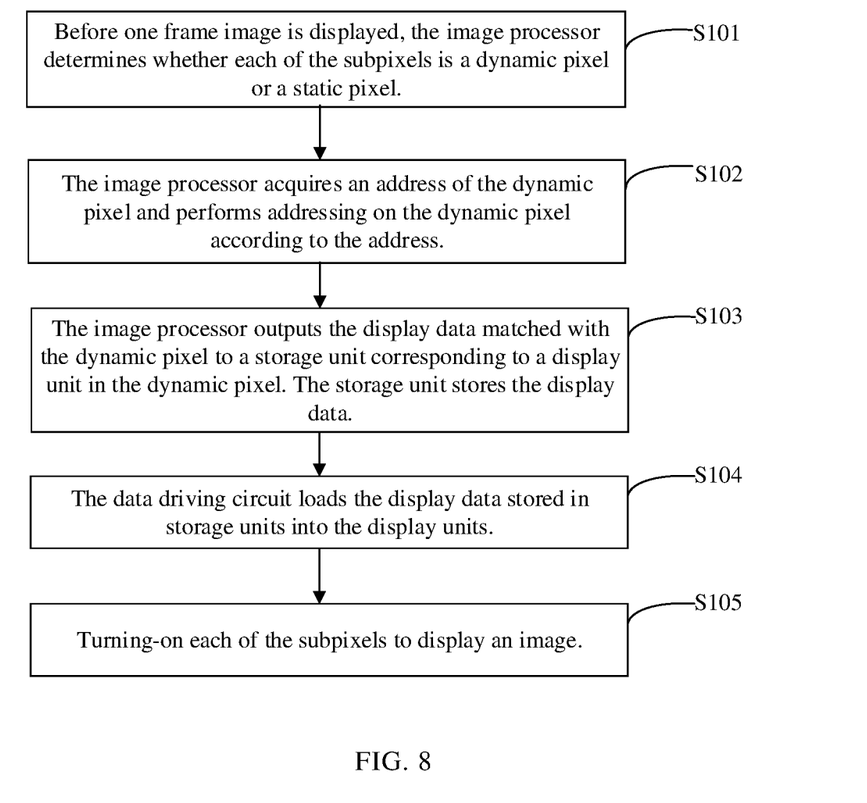
FIG. 8 is a flow chart of a driving method of a display device according to some embodiments of the present disclosure.

The embodiments of the present disclosure further provide a driving method, for example, for driving the display device according to the embodiments of the present disclosure. When the display panel includes a data driving circuit 10 and a plurality of subpixels 103, as shown in FIG. 8, the driving method includes the following steps.

In step S101, before one frame image is displayed, the image processor 20 determines whether each of the subpixels 103 is a dynamic pixel or a static pixel.

For example, in an embodiment of the present disclosure, the step S101 can include:

the image processor 20 obtaining display data of consecutive frames of images; and the image processor 20 determining that, when a number of repetitions of the consecutive n frames of display data matched with one subpixel 103 is greater than or equal to m, the one subpixel is a static pixel; and the image processor 20 determining that, when the number of repetitions of the consecutive n frames of display data matched with one subpixel 103 is less than m, the one subpixel is a dynamic pixel; wherein $1<m\leq n$, n and m are positive integers.

For example, when the image processor 20 can also render each subpixel 103 while performing the step S101.

In step S103, the image processor 20 outputs the display data matched with the dynamic pixel to a storage unit 101 corresponding to a display unit 102 in the dynamic pixel. The storage unit 101 stores the display data.

It should be noted that after the above-mentioned step S101 and before the step S103, the driving method can further include the following step 120.

In step S102, the image processor 20 acquires an address of the dynamic pixel and performs addressing on the dynamic pixel according to the address.

Figure 9:
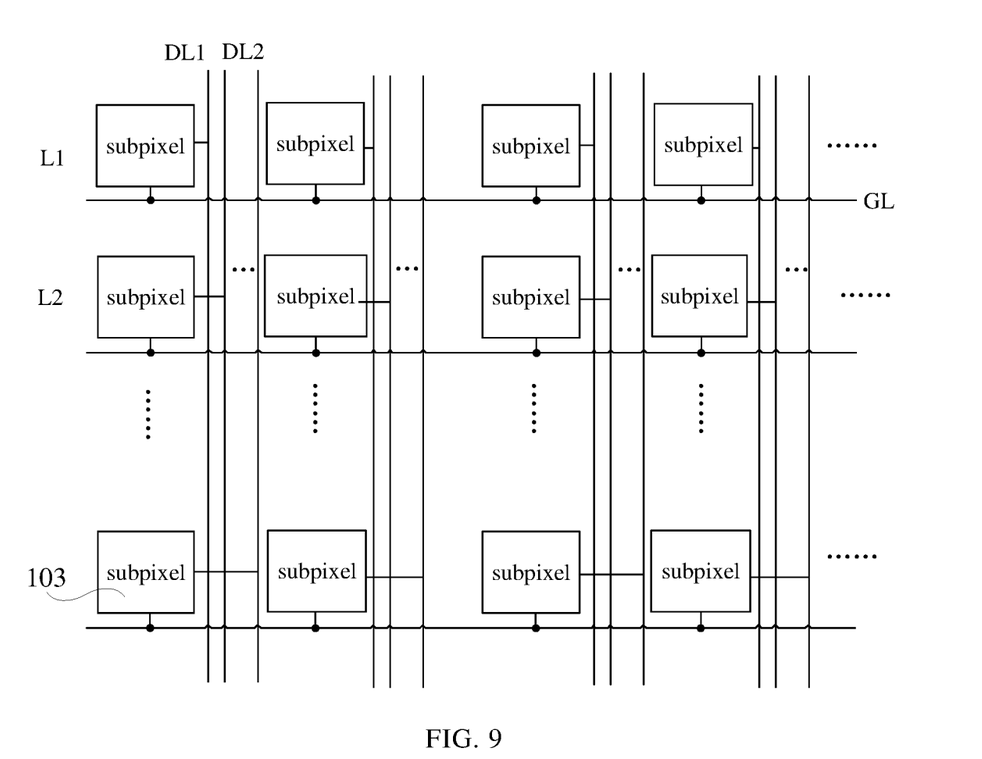
FIG. 9 is a connection schematic diagram of a subpixel with a data line and a gate line in FIG. 1A.

For example, as shown in FIG. 9, each subpixel 103 is connected with a data line DL through its internal display unit 102, and the subpixels 103 located in a same row is connected with a same gate line GL through its internal display unit 102. In this case, a wiring order of the data lines DL connected with a plurality of subpixels 103 located in a same column and different rows can correspond to the order in which the plurality of subpixels 103 are sequentially arranged. For example, for a plurality of subpixels 103 located in the same column and different rows, as shown in FIG. 9, the subpixels 103 of the first row L1 are connected with the data line DL1 located at a first wiring position, and the subpixels 103 of the second row L2 are connected with the data line DL2 located at a second wiring position. Additionally, the wiring positions of the data lines connected with the second column of subpixels 103 are superimposed on the basis of the wiring position of the data line connected with the subpixel 103 of the last row of the first column. In this case, a horizontal coordinate X of a subpixel 103 can be determined by the wiring position of the gate line GL, and then a vertical coordinate Y of the subpixel 103 can be determined by the wiring position of the data line DL.

Based on this, after the step S101 is executed and it is judged which subpixels 103 are dynamic pixels, the wiring positions of the data line DL and gate line GL connected with each of the dynamic pixels are obtained, and the addresses (X, Y) of the dynamic pixels are obtained. Based on the addresses (X, Y), the image processor 20 can obtain dynamic pixels matched with the addresses from a plurality of dynamic pixels, thereby performing addressing on the dynamic pixel. Next, the image processor 20 can obtain the storage unit 101 corresponding to the dynamic pixel, so that the image processor 20 can output the display data matched with the dynamic pixel with the address (X, Y) to the storage unit 101 according to the above-mentioned address (X, Y) in the step S103. X and Y are positive integers greater than or equal to 1.

In step S104, the data driving circuit 10 loads the display data stored in storage units 101 into the display units.

For example, when the data driving circuit 10 includes a gamma voltage circuit 120, a plurality of switch circuits 121 (MUX) and a plurality of decoding circuits 122 as shown in FIG. 4, the step S104 can include the following steps.

The decoding circuits 122 turn on one switch device 1210 of each of the switch circuits 121 according to the display data stored in the storage units 101.

The gamma voltage regulation sub-circuit 1201 in the gamma voltage circuit 120 generates a plurality of gray-scale voltages, and outputs the gray-scale voltages to a data line DL electrically connected with a turned-on switch device 1210 through the turned-on switch device 1210 of each of the switch circuits 121.

In step S105, turning-on each of the subpixels to display an image.

With the driving method provided by the embodiments of the present disclosure, when frames of images are displayed consecutively, and a part of the image does not change in consecutive frames, the image processor 20 only needs to provide display data to the storage units 101 corresponding to the dynamic pixels, and does not need to provide the display data to the storage units 101 corresponding to the static pixels. Therefore, during display, the full screen image is not necessarily updated all the time, thereby reducing the power consumption.

The embodiments of the present disclosure provide a pixel circuit, a display panel, a display device and a driving method. As can be seen from the above, each of the display units corresponds to one storage unit, and the storage unit stores display data matched with the display unit. In this case, for example, it is possible to judge whether each of the subpixels is a static pixel or a dynamic pixel before one frame image is displayed. For example, when frames of images are displayed consecutively, subpixels corresponding to the portion where the image changes are the dynamic pixels, and subpixels corresponding to the portion where the image does not change are the static pixels. In this case, the storage units corresponding to the display units in the dynamic pixels can receive display data matched with the dynamic pixels, so as to update the display data. The storage units corresponding to the display units in the static pixels only need to keep the display data which are stored before. In this way, when frames of images are displayed consecutively, and a part of the image does not change in consecutive frames, the storage units corresponding to the display units in the dynamic pixels receive display data, and the storage units corresponding to the display units in the static pixels do not need to receive new display data. Therefore, the display panels provided by the embodiments of the present disclosure do not need to update the full screen image during a display process, and the power consumption can be reduced. Based on this, when all the subpixels in one frame image are static pixels, it is not necessary to update the entire display image.

What have been described above are only specific implementations of the present disclosure, the protection scope of the present disclosure is not limited thereto. The protection scope of the present disclosure should be based on the protection scope of the claims.

What is claimed is:

1. A display panel, comprising:
   a silicon substrate, a plurality of display units and a plurality of storage units fabricated on the silicon substrate; and a data driving circuit disposed on the silicon substrate;

wherein the plurality of storage units correspond to the plurality of display units one to one, and the plurality of storage units are respectively configured to receive and store display data of the plurality of display units corresponding to the plurality of storage units;

the data driving circuit is connected with the display units and the storage units; and the data driving circuit is configured to load the display data stored in the storage units into the display units;

the data driving circuit comprises a gamma voltage circuit, a plurality of switch circuits, and a plurality of decoding circuits;

each decoding circuit of the decoding circuits is electrically connected with one storage unit, one switch circuit and one data line, and the each decoding circuit is configured to turn on one switch device of the switch circuits according to the display data stored in the storage units;

each of the switch circuits is electrically connected with a plurality of gray-scale output terminals of the gamma voltage circuit through a plurality of switch devices in each of the switch circuits one by one; and the gamma voltage circuit is configured to generate a plurality of gray-scale voltages, and output the gray-scale voltages to a data line electrically connected with a turned-on switch device through the turned-on switch device of each of the switch circuits.

2. The display panel according to claim 1, wherein the display panel comprises a plurality of subpixels, and the display units are respectively disposed in the subpixels; and the storage units are respectively in the subpixels, or are each between two adjacent subpixels.

3. The display panel according to claim 1, wherein a material employed by the silicon substrate comprises monocrystalline silicon, polycrystalline silicon, or amorphous silicon.

4. The display panel according to claim 1, wherein the storage units each comprise a static random access memory.

5. The display panel according to claim 1, wherein the display units each comprise a reflective layer covering the silicon substrate and a liquid crystal layer in sequence.

6. The display panel according to claim 1, wherein the display units each comprise an organic light emitting diode or an LED display device, the organic light emitting diode or the LED display device being disposed on the silicon substrate.

7. The display panel according to claim 1, wherein the gamma voltage circuit comprises a gamma voltage regulation sub-circuit, a plurality of digital-to-analog conversion sub-circuits, and a plurality of operational amplification sub-circuits;

a plurality of output terminals of the gamma voltage regulation sub-circuit are connected with the plurality of digital-to-analog conversion sub-circuits one to one;

each of the digital-to-analog conversion sub-circuits is electrically connected with an input terminal of one of the operational amplification sub-circuits; and output terminals of the operational amplification sub-circuits are the gray-scale output terminals of the gamma voltage circuit.

8. A display device, comprising the display panel according to claim 7 and an image processor connected with the display panel, wherein the image processor is configured to output the display data to the storage units, and the display data are matched with subpixels where the display units corresponding to the storage units are located.

9. A display device, comprising the display panel according to claim 1 and an image processor connected with the display panel, wherein the image processor is configured to output the display data to the storage units, and the display data are matched with subpixels where the display units corresponding to the storage units are located.

10. A driving method of the display device according to claim 9, wherein when the display panel comprises a data driving circuit and subpixels, the driving method comprises:

before one frame image is displayed, the image processor determining whether each of the subpixels is a dynamic pixel or a static pixel;

the image processor outputting display data matched with the dynamic pixel to a storage unit corresponding to a display unit in the dynamic pixel, the storage unit storing the display data;

the data driving circuit loading the display data stored in the storage units into the display units; and turning-on each of the subpixels to display an image.

11. The driving method of the display device according to claim 10, wherein when the data driving circuit comprises a gamma voltage circuit, a plurality of switch circuits and a plurality of decoding circuits, the data driving circuit loading the display data stored in the storage units into the display units comprises:

the decoding circuits turning on one switch device of each of the switch circuits according to the display data stored in the storage units;

the gamma voltage circuit generating a plurality of gray-scale voltages, and outputting the gray-scale voltages to a data line electrically connected with a turned-on switch device through the turned-on switch device of each of the switch circuits.

12. The driving method of the display device according to claim 11, wherein the image processor determining whether each of the subpixels is a dynamic pixel or a static pixel comprises:

the image processor obtaining display data of consecutive frames of images; and the image processor determining that, when a number of repetitions of the consecutive n frames of display data matched with one subpixel is greater than or equal to m, the one subpixel is a static pixel; and the image processor determining that, when the number of repetitions of the consecutive n frames of display data matched with one subpixel is less than m, the one subpixel is a dynamic pixel;

$1<m\leq n$, n and m are positive integers.

13. The driving method of the display device according to claim 10, wherein after the image processor determines whether each of the subpixels is a dynamic pixel or a static pixel, and before the image processor outputs the display data matched with the dynamic pixel to the storage unit corresponding to the display unit in the dynamic pixel, the driving method further comprises:

the image processor acquiring an address of the dynamic pixel and performing addressing on the dynamic pixel according to the address.

14. The driving method of the display device according to claim 13, wherein the image processor determining whether each of the subpixels is a dynamic pixel or a static pixel comprises:

the image processor obtaining display data of consecutive frames of images; and the image processor determining that, when a number of repetitions of the consecutive n frames of display data matched with one subpixel is greater than or equal to m, the one subpixel is a static pixel; and the image processor determining that, when the number of repetitions of the consecutive n frames of display data matched with one subpixel is less than m, the one subpixel is a dynamic pixel;

$1 < m \leq n$, n and m are positive integers.

15. The driving method of the display device according to claim 10, wherein the image processor determining whether each of the subpixels is a dynamic pixel or a static pixel comprises:

the image processor obtaining display data of consecutive frames of images; and the image processor determining that, when a number of repetitions of the consecutive n frames of display data matched with one subpixel is greater than or equal to m, the one subpixel is a static pixel; and the image processor determining that, when the number of repetitions of the consecutive n frames of display data matched with one subpixel is less than m, the one subpixel is a dynamic pixel;

$1 < m \leq n$, n and m are positive integers.

16. A pixel circuit, comprising a storage unit disposed on a silicon substrate, wherein the storage unit is configured to receive and store display data matched with a subpixel where the pixel circuit is located;

the storage unit is further connected to a data driving circuit, and the data driving circuit is configured to load the display data stored in the storage unit into the subpixel;

the data driving circuit comprises a gamma voltage circuit, a plurality of switch circuits, and a plurality of decoding circuits;

each decoding circuit of the decoding circuits is electrically connected with one storage unit, one switch circuit and one data line, and the each decoding circuit is configured to turn on one switch device of the switch circuits according to the display data stored in the storage units;

each of the switch circuits is electrically connected with a plurality of gray-scale output terminals of the gamma voltage circuit through a plurality of switch devices in each of the switch circuits one by one; and the gamma voltage circuit is configured to generate a plurality of gray-scale voltages, and output the gray-scale voltages to a data line electrically connected with a turned-on switch device through the turned-on switch device of each of the switch circuits.

* * * * *